US009922523B2

United States Patent
Yao

(10) Patent No.: US 9,922,523 B2
(45) Date of Patent: Mar. 20, 2018

(54) EMERGENCY REPORTING SYSTEM

(71) Applicant: E3 Co., Ltd., 32F, Tokyo (JP)

(72) Inventor: Bingwei Yao, Tokyo (JP)

(73) Assignee: E3 CO., LTD., Tokyo (JP)

( * ) Notice: Subject to any disclaimer, the term of this patent is extended or adjusted under 35 U.S.C. 154(b) by 0 days.

(21) Appl. No.: 15/316,663

(22) PCT Filed: Feb. 18, 2016

(86) PCT No.: PCT/JP2016/054664
§ 371 (c)(1),
(2) Date: Dec. 6, 2016

(87) PCT Pub. No.: WO2017/141389
PCT Pub. Date: Aug. 24, 2017

(65) Prior Publication Data
US 2018/0040221 A1    Feb. 8, 2018

(51) Int. Cl.
*G08B 1/08* (2006.01)
*G08B 25/04* (2006.01)
(Continued)

(52) U.S. Cl.
CPC ....... *G08B 21/043* (2013.01); *G08B 21/0446* (2013.01); *G08B 25/016* (2013.01);
(Continued)

(58) Field of Classification Search
CPC ............. G08B 21/043; G08B 21/0446; G08B 25/016; G08B 25/10; H04M 1/2745; H04M 1/72538
See application file for complete search history.

(56) References Cited

U.S. PATENT DOCUMENTS 7,342,491 B2 *  3/2008  Fujisawa .............. A61B 5/0002
                                                  340/12.54
2005/0245839 A1 * 11/2005  Stivoric ............... A61B 5/0008
                                                  600/549
(Continued)

FOREIGN PATENT DOCUMENTS

CN         104144216 A     11/2014
JP        H10-040483 A      2/1998
(Continued)

OTHER PUBLICATIONS

Terroso et al., "Active assistance for senior healthcare: A wearable system for fall detection", 2013 8th Iberian Conference on Information Systems and Technologies (CISTI), AISTI, Jun. 19, 2013, pp. 1-6.
(Continued)

*Primary Examiner* — Sisay Yacob
(74) *Attorney, Agent, or Firm* — Polsinelli PC

(57) ABSTRACT

A state of movement of a body of a person is detected in a wearable device 10, and movement information representing the state of the movement of the body which is detected is sent by wireless together with URL of a server device 30 and a terminal ID. When the sent information is received in a portable terminal 20, the portable terminal 20 gives access to the server device 30 based on the URL and transmits the movement information and the terminal ID to the server device 30. The server device 30 reports occurrence of an emergency and transmits the movement information which is processed so as to perform transfer to contact details related to the terminal ID in response to the access given from the portable terminal 20.

12 Claims, 8 Drawing Sheets

(51) Int. Cl.
  *G08B 21/02* (2006.01)
  *G08B 21/04* (2006.01)
  *H04M 1/2745* (2006.01)
  *G08B 25/10* (2006.01)
  *H04M 1/725* (2006.01)
  *G08B 25/01* (2006.01)

(52) U.S. Cl.
  CPC .......... *G08B 25/10* (2013.01); *H04M 1/2745* (2013.01); *H04M 1/72538* (2013.01)

(56) References Cited

U.S. PATENT DOCUMENTS

| | | | | |
|---|---|---|---|---|
| 2007/0252708 A1* | 11/2007 | Fujisawa | ............. | A61B 5/0002 340/573.1 |
| 2008/0129518 A1* | 6/2008 | Carlton-Foss | ........ | A61B 5/1117 340/573.1 |
| 2009/0160643 A1* | 6/2009 | Lizza | ................ | G08B 21/0415 340/540 |
| 2012/0295575 A1* | 11/2012 | Nam | .................... | G08B 25/016 455/404.1 |
| 2012/0326875 A1* | 12/2012 | Coppola | ............ | G08B 21/0261 340/573.4 |
| 2014/0368601 A1* | 12/2014 | deCharms | ............. | H04W 4/021 348/14.02 |
| 2015/0094544 A1* | 4/2015 | Spolin | ................... | A61B 5/7275 600/301 |
| 2015/0305690 A1* | 10/2015 | Tan | .................... | G08B 21/0446 600/301 |
| 2016/0192166 A1* | 6/2016 | deCharms | ............. | H04W 4/021 348/14.02 |

FOREIGN PATENT DOCUMENTS

| | | |
|---|---|---|
| JP | H11-070086 A | 3/1999 |
| JP | 2000-293775 A | 10/2000 |
| JP | 2002-056479 A | 2/2002 |
| JP | 2004-013388 A | 1/2004 |
| JP | 2005-202810 A | 7/2005 |
| JP | 2010-067169 A | 3/2010 |
| JP | 2013-518501 A | 5/2013 |

OTHER PUBLICATIONS

Gutierrez et al., "Activity monitoring and emergency warning with location information of the user", Intelligent Signal Processing (WISP), 2011 IEEE 7th International Symposium, Sep. 19, 2011, pp. 1-6.

Liu et al., "Design and implementation of an intelligent belt system using accelerometer", 2015 37th Annual International Conference of the IEEE Engineering in Medicine and Biology Society (EMBC), Aug. 25, 2015, pp. 2043-2046.

Extended European Search Report dated Oct. 19, 2017 in EP 16800864.7.

* cited by examiner

EMERGENCY REPORTING SYSTEM

TECHNICAL FIELD

The present invention relates to an emergency reporting system, and more particularly, is suitably used for a system which reports an emergency such as fall-down of a person or an accident.

BACKGROUND ART

Conventionally, there is provided an emergency reporting system for reporting occurrence of an emergency to predetermined contact details when the emergency occurs. For example, there is known a system for reporting occurrence of a traffic accident of an automobile to specific contact details when the accident occurs. In particular, there are many systems for transmitting information representing a situation of an accident in addition to the report of occurrence of the accident (for example, see Patent Documents 1 to 3).

Referring to the emergency reporting device described in the Patent Document 1, a specific reporting destination number registered previously is called automatically when occurrence of an emergency is detected, and image information generated by a navigation system is transmitted by wireless when a communication line with the reporting destination is established.

Referring to the emergency reporting device described in the Patent Document 2, when occurrence of an emergency is detected, the occurrence of the emergency and position information about a current position are reported to a predetermined emergency reporting destination through a wireless communicating unit, and furthermore, telephone numbers of the device and a predetermined terminal device are reported to a predetermined emergency reporting destination through a wireless communicating unit.

Referring to the emergency countermeasure system described in the Patent Document 3, in the case in which occurrence of an accident is detected, a degree of the accident is decided based on an acceleration detected by a G sensor and a current position, personal information, vehicle information or the like is transmitted to a reception center in addition to a result of the decision of the degree of the accident.

According to the systems described in the Patent Documents 1 to 3, the fact of the occurrence of the accident can be reported to contact details registered previously, and furthermore, contents of the accident (position information representing an accident scene, image information representing a situation of the accident scene, information representing a degree of the accident and the like) can be transmitted. However, all of these systems suppose an automobile accident and need to include many equipments, for example, various sensors for detecting the occurrence or degree of an accident, a GPS receiver for detecting a current position, and a communicating device connected to a telephone line, internet or the like for performing wireless communication.

For this reason, there is a problem in that the systems described in the Patent Documents 1 to 3 cannot be applied to an emergency occurring in a situation in which the equipments described above are provided with difficulty. For example, the systems cannot be applied to the case in which an old person walking on a road falls down. In some cases, the old person wears an emergency reporting pendant for confirming his (her) safety. In these cases, the person himself (herself) falling down or a third person finding the fall-down operates the emergency reporting pendant so that an emergency report can be given to contact details registered previously. However, information representing a situation in the fall-down cannot be transmitted.

Moreover, the systems cannot be applied to the case in which players collide with each other and concuss the brain when they are playing a sports game such as soccer or rugby football. In this case, game watchers are present in the surrounding. Therefore, the game watchers can take necessary measures. However, there is a problem in that it is impossible to get in touch with people concerned with the player concussing the brain when they are not present in that place.

In the case of a two-wheeled vehicle such as a bicycle or a motorcycle, moreover, it is hard to provide the many equipments described above. For this reason, similarly, the systems cannot be applied to the case in which the two-wheeled vehicle causes a traffic accident. In particular, in the case of the traffic accident caused by the two-wheeled vehicle, there is a problem in that a finder often cannot ask a person causing the traffic accident questions to confirm contact details and cannot make an emergency contact with the concerned people even if the finder can call an ambulance.

Patent Document 1: Japanese Laid-Open Patent Publication No. 2000-293775

Patent Document 2: Japanese Laid-Open Patent Publication No. 2004-13388

Patent Document 3: Japanese Laid-Open Patent Publication No. 2002-56479

DISCLOSURE OF THE INVENTION

The present invention has been made to solve these problems and has an object to enable a report, to predetermined contact details, of information representing occurrence of an emergency in a situation in which many equipments such as various sensors, a GPS receiver and a communicating device are provided with difficulty, and information representing the situation.

In order to attain the object, in the present invention, a state of movement of a body of a person is detected in a wearable device, and movement information representing the state of the movement of the body which is detected is sent by wireless together with location information of a server device and predetermined identification information. When the sent information is received in a portable terminal, the portable terminal gives access to the server device based on the location information and transmits the movement information and the identification information to the server device. The server device reports occurrence of an emergency and transmits the movement information to contact details indicated by contact information stored in a contact information storing unit in relation to the identification information in response to the access given from the portable terminal.

According to the present invention having the structure described above, also in a situation in which it is hard to provide a variety of equipments such as various sensors, a GPS receiver and a communicating device, if a person wears the wearable device, movement information representing a state of movement of a body of the person and predetermined identification information are transmitted to the server device through the portable terminal which is close so that occurrence of an emergency is reported to the contact details related to the identification information together with the transmission of the movement information. Referring to the emergency occurring in the situation in which it is hard to provide the above equipments, consequently, the occurrence of the emergency and movement information representing the situation can be reported to predetermined contact details.

BEST MODE FOR CARRYING OUT THE INVENTION

Figure 1:
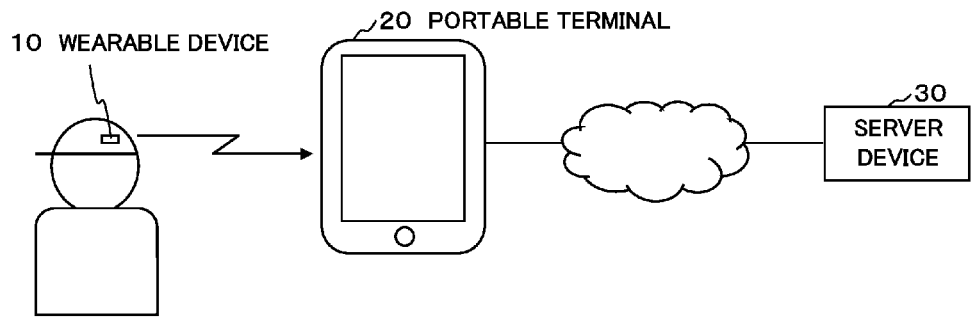
FIG. 1 is a diagram showing an example of a whole structure of an emergency reporting system according to the present embodiment.

An embodiment of the present invention will be described below with reference to the drawings. FIG. 1 is a diagram showing an example of a whole structure of an emergency reporting system according to the present embodiment. As shown in FIG. 1, the emergency reporting system according to the present embodiment includes a wearable device 10 to be worn by a person and be thus used, a portable terminal 20 for communicating with the wearable device 10 and a server device 30 for communicating with the portable terminal 20.

The wearable device 10 may be any of a head mount type, a spectacle type, a wristband type, a closing insertion type and the like. The wearable device 10 includes a nine-axis sensor (a triaxial acceleration sensor, a triaxial angular velocity sensor and a triaxial geomagnetic sensor) and wireless communicating means through BLE (Bluetooth Low Energy), and sends acceleration information, angular velocity information and azimuth information detected by the nine-axis sensor (an example of movement information representing a state of movement of a body of a person) and predetermined identification information by wireless.

The portable terminal 20 may be a smartphone, a tablet terminal, a wearable terminal and or the like, for example. In the present embodiment, it is assumed that a third person who is close to a person wearing the wearable device 10 holds the portable terminal 20.

The portable terminal 20 includes wireless communicating means through Bluetooth (registered trademark) and internet connecting means using a predetermined application program (hereinafter referred to as an application). The portable terminal 20 transmits the movement information and identification information received from the wearable device 10 to the server device 30 by the application and displays a predetermined display screen sent from the server device 30 as a response thereto by the application. The display screen includes emergency contact information and processed movement information which is processed for transfer.

The server device 30 generates the predetermined display screen by using the movement information transmitted from the portable terminal 20 and the contact information related to the identification information and supplies the predetermined display screen to the application of the portable terminal 20. When the identification information is transmitted from the portable terminal 20, moreover, the server device 30 reports the occurrence of an emergency to contact details registered previously in relation to the identification information.

Figure 2:
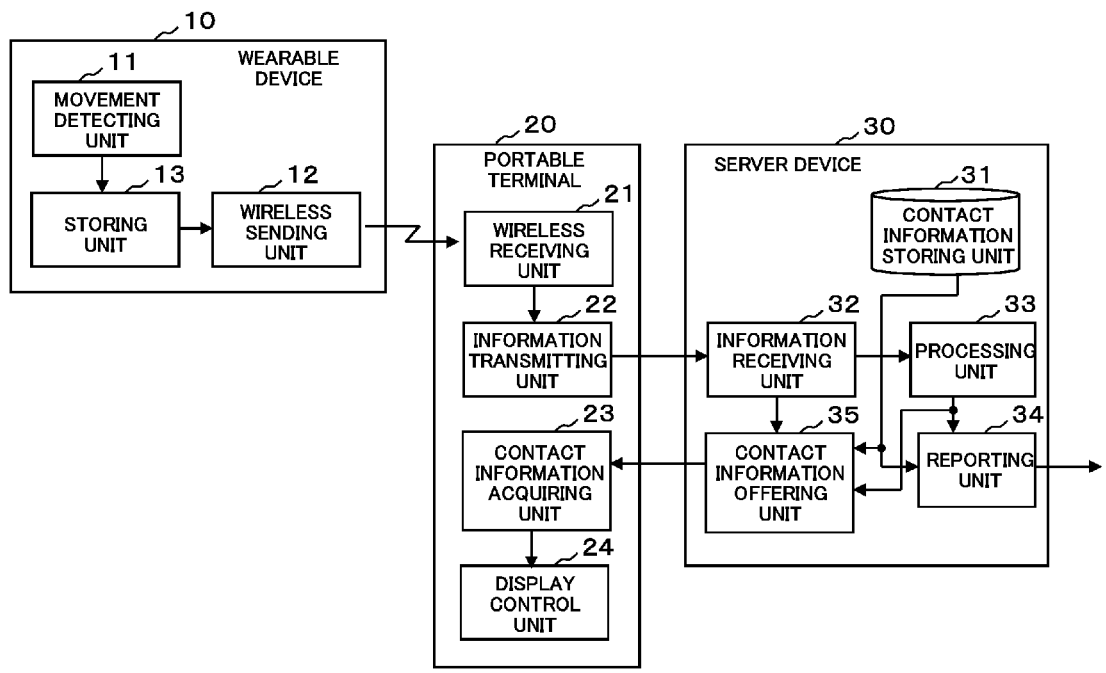
FIG. 2 is a block diagram showing an example of functional structures of a wearable device, a portable terminal and a server device which configure the emergency reporting system according to the present embodiment.

FIG. 2 is a block diagram showing an example of functional structures of the wearable device 10, the portable terminal 20 and the server device 30 which configure the emergency reporting system according to the present embodiment.

As shown in FIG. 2, the wearable device 10 includes a movement detecting unit 11 and a wireless sending unit 12 as functional structures thereof. Moreover, the wearable device 10 includes a storing unit 13 for storing information.

The portable terminal 20 includes a wireless receiving unit 21, an information transmitting unit 22, a contact information acquiring unit 23 and a display control unit 24 as functional structures thereof. Each of the functional blocks 21 to 24 can be configured from all of hardware, DSP (Digital Signal Processor) and software. For example, in the case in which each of the functional blocks 21 to 24 is configured from the software, it actually includes a CPU, an RAM, an ROM and the like in a computer and is implemented by an operation of a program stored in a recording medium such as an RAM, an ROM, a hard disk or a semiconductor memory. The functions of the information transmitting unit 22, the contact information acquiring unit 23 and the display control unit 24 are implemented by utilization of the application described above.

The server device 30 includes a contact information storing unit 31 as a database. Moreover, the server device 30 includes an information receiving unit 32, a processing unit 33, a reporting unit 34 and a contact information offering unit 35 as functional structures thereof. Each of the functional blocks 32 to 35 provided in the server device 30 can also be configured from all of hardware, DSP and software.

The movement detecting unit 11 of the wearable device 10 detects a state of movement of a body of a person by the nine-axis sensor. Although there is taken an example in which the nine-axis sensor is used, the present invention is not restricted thereto. For example, any of an acceleration sensor, an angular velocity sensor and a geomagnetic sensor may be used. In addition, a sensor capable of detecting the state of the movement of the body of the person can be used as the movement detecting unit 11 if any.

Movement information representing the state of the movement of the body detected by the movement detecting unit 11 is stored in the storing unit 13. The wireless sending unit 12 sends the movement information representing the state of the movement of the body detected by the movement detecting unit 11 (specifically, the information stored in the storing unit 13) by wireless together with location information of the server device 30 and predetermined identification information by utilizing the wireless communicating means of the BLE.

The location information is URL (Uniform Resource Locator) to be used in access to the server device 30. The predetermined identification information is a terminal ID of the wearable device 10, for example. Alternatively, the predetermined identification information may be a user ID of a user using the wearable device 10. The URL and the predetermined identification information (which will be hereinafter explained as a terminal ID) are prestored in the storing unit 13.

The wireless sending unit 12 repetitively push-transmits the movement information, the URL and the terminal ID as beacon information at a certain time interval, for example. At this time, all of the movement information stored in the storing unit 13 can be transmitted, for example. Alternatively, it is also possible to transmit any of the movement information stored in the storing unit 13 corresponding to only a last predetermined time or predetermined amount. Alternatively, it is also possible to transmit any of the movement information stored in the storing unit 13 corresponding to a predetermined time or predetermined amount by going back from a time that a value of an acceleration is larger than a predetermined threshold.

The wireless receiving unit 21 of the portable terminal 20 receives information sent by the wireless sending unit 12 of the wearable device 10. When the portable terminal 20 enters a wireless communication range through the BLE from the wearable device 10, specifically, the wireless receiving unit 21 receives the movement information, the URL and the terminal ID (which will be collectively referred to as sent information) which are sent by the wireless sending unit 12. In other words, when a third person holding the portable terminal 20 approaches a person wearing the wearable device 10 and enters the wireless communication range through the BLE, the wireless receiving unit 21 receives the sent information which is push-transmitted by the wireless sending unit 12.

When the wireless receiving unit 21 receives the sent information sent from the wireless sending unit 12, the information transmitting unit 22 gives access to the server device 30 based on the URL included in the sent information and transmits, to the server device 30, the movement information and the terminal ID which are included in the sent information.

Herein, the information transmitting unit 22 activates the application of the portable terminal 20 when the wireless receiving unit 21 receives the sent information from the wireless sending unit 12. Then, a confirmation screen is displayed by the application to cause the user of the portable terminal 20 to select whether the movement information or the like is transmitted to the server device 30. When the user selects "transmission", the application transmits the movement information and the terminal ID to the server device 30. In other words, the information transmitting unit 22 designates the URL received by the wireless receiving unit 21 to give access to the server device 30 in the activated application, thereby transmitting the movement information and the terminal ID to the server device 30.

For example, when a third person finding a person falling down on the road approaches the person and simply selects "transmission" on the confirmation screen displayed on the portable terminal 20 of the third person in which the application is installed, the movement information and the terminal ID sent from the wearable device 10 worn by the person falling down can be transmitted to the server device 30 through the portable terminal 20 of the third person. When a game watcher approaches a person falling down during exercise and simply selects "transmission" on the confirmation screen displayed on the portable terminal 20 of the game watcher, moreover, the movement information and the terminal ID sent from the wearable device 10 worn by the person falling down can be transmitted to the server device 30 through the portable terminal 20 of the game watcher.

The contact information storing unit 31 of the server device 30 stores the terminal ID of the wearable device 10 and the contact information in relation to each other. The contact information is information registered previously as contact details for reporting occurrence of an emergency over a person wearing the wearable device 10 if any. An example of the contact information is a mail address of a portable terminal (not shown) held by a person concerned with the person wearing the wearable device 10. Moreover, the contact information may be an address of an application (for example, a chat application) capable of receiving a push message which is installed in the portable terminal held by the concerned person.

The information receiving unit 32 receives the movement information and the terminal ID transmitted in addition to the URL from the portable terminal 20. In other words, the information receiving unit 32 accepts access from the application of the portable terminal 20 and receives the movement information and the terminal ID which are transmitted through the access.

The processing unit 33 processes the movement information received by the information receiving unit 32 so as to perform transfer. In other words, the processing unit 33 generates information for transfer that represents which direction and which posture change for the movement of the person wearing the wearable device 10 based on the movement information. For example, the processing unit 33 generates track information representing movement of the nine-axis sensor (in other words, movement of a part of a body where the nine-axis sensor is provided) based on the movement information.

In addition to the track information, moreover, it is also possible to generate impact information representing a strength of an impact given to the person wearing the wearable device 10. The strength of the impact is proportional to a volume of acceleration information. For example, it is possible to represent the strength of the impact in a plurality of stages and to generate, as the impact information, which stage of the strength of the impact is given to the person. The contents of the processing described herein are only illustrative and the present invention is not restricted thereto.

The reporting unit 34 reports the occurrence of an emergency to the contact details indicated by the contact information stored in the contact information storing unit 31 in relation to the terminal ID received by the information receiving unit 32 in response to the access given from the portable terminal 20. At this time, the reporting unit 34 transmits, to the contact details, processed movement information which is processed by the processing unit 33 together with the report of the occurrence of the emergency.

In the case in which the mail address of the portable terminal of the concerned person is registered as the contact information, a message informing the concerned person of the occurrence of an emergency and the processed movement information are transmitted to a portable terminal of contact details through an electronic mail. In the case in which there is registered, as the contact information, an address of a chat application installed in the portable terminal of the concerned person, moreover, the message informing the concerned person of the occurrence of the emergency and the processed movement information are transmitted to the portable terminal of the contact details through a push message.

In the present embodiment, the reporting unit 34 decides whether a larger value than a first threshold is included in an output value of the acceleration sensor which is received as the movement information by the information receiving unit 32, and reports the occurrence of the emergency to the contact details only when the larger value than the first threshold is included. In addition, the reporting unit 34 may calculate an accumulation value of the output value of the acceleration sensor which is received as the movement information by the information receiving unit 32 to report the occurrence of the emergency to the contact details also when the accumulation value is larger than a second threshold.

The contact information offering unit 35 offers, to the portable terminal 20, the contact information stored in the contact information storing unit 31 in relation to the terminal ID received by the information receiving unit 32 in response to the access given from the portable terminal 20. Specifically, the contact information offering unit 35 generates a display screen to be displayed on the portable terminal 20 by using contact information related to the terminal ID and offers the display screen to the portable terminal 20.

The contact information acquiring unit 23 of the portable terminal 20 acquires the contact information offered by the contact information offering unit 35 of the server device 30. In the present embodiment, the contact information acquiring unit 23 acquires the display screen transmitted from the contact information offering unit 35 of the server device 30, thereby acquiring the contact information as information included in the display screen.

The display control unit 24 displays the contact information acquired by the contact information acquiring unit 23. In the present embodiment, the display control unit 24 displays the contact information via the display screen acquired by the contact information acquiring unit 23.

Consequently, the contact details in the occurrence of the emergency (the mail address, the address of the chat application or the like of the concerned person) are displayed on the portable terminal 20 of the third person approaching the person falling down. Accordingly, it is also possible to directly give the contact of the occurrence of the emergency from the third person to the concerned person. As the contact information to be displayed in this case, a telephone number of the concerned person may further be included. In this case, the telephone number is also registered previously in the contact information storing unit 31.

In addition to the contact information, the processed movement information may be transmitted from the server device 30 to the portable terminal 20 and displayed thereon. In this case, the contact information offering unit 35 generates a display screen by using the processed movement information which is processed by the processing unit 33 and the contact information read from the contact information storing unit 31 and offers the display screen to the portable terminal 20.

The contact information acquiring unit 23 of the portable terminal 20 acquires the display screen to be transmitted from the contact information offering unit 35 of the server device 30, thereby acquiring the contact information and the processed movement information as information included in the display screen. Then, the display control unit 24 displays the display screen acquired by the contact information acquiring unit 23, thereby displaying the contact information and the processed movement information.

Thus, the processed movement information is also displayed on the portable terminal 20 in addition to the contact information. When the contact of the occurrence of the emergency is to be made from the third person seeing the display to the concerned person, consequently, it is possible to transfer a situation in the occurrence of the emergency such as a degree of impact and a posture change by which a person fell down with reference to the processed movement information.

Figure 3:
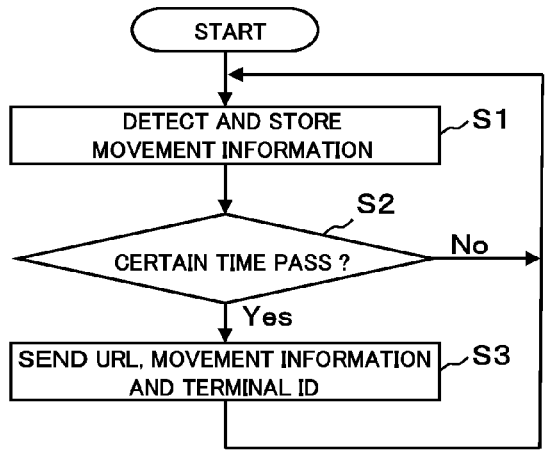
FIG. 3 is a flowchart showing an example of an operation of the wearable device according to the present embodiment.
Figure 4:
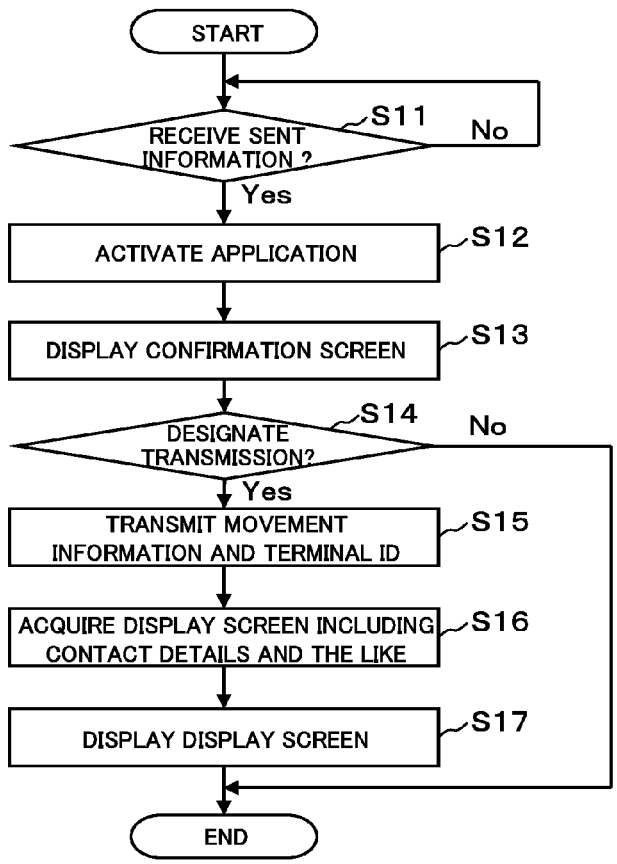
FIG. 4 is a flowchart showing an example of an operation of the portable terminal according to the present embodiment.
Figure 5:
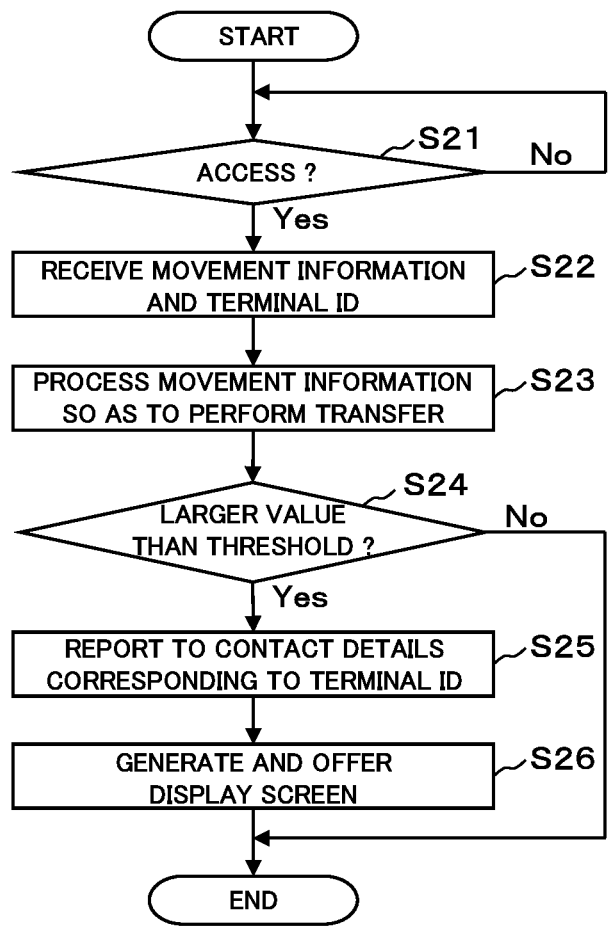
FIG. 5 is a flowchart showing an example of an operation of the server device according to the present embodiment.

FIGS. 3 to 5 are flowcharts showing an example of an operation of the emergency reporting system according to the present embodiment having the structure described above. FIG. 3 is a flowchart showing an example of the operation of the wearable device 10. FIG. 4 is a flowchart showing an example of the operation of the portable terminal 20. FIG. 5 is a flowchart showing an example of the operation of the server device 30.

The flowchart for the wearable device 10 shown in FIG. 3 is started when a power supply of the wearable device 10 is turned ON and is repetitively executed until the power supply is turned OFF.

First of all, the movement detecting unit 11 detects movement information representing a state of movement of a body of a person through the nine-axis sensor and stores the movement information in the storing unit 13 (Step S1). Next, the wireless sending unit 12 decides whether a certain time passes since last sending (Step S2). If the certain time has not passed yet, the processing is returned to Step S1 and the movement information is continuously stored in the storing unit 13.

On the other hand, if the certain time passes since the last sending, the wireless sending unit 12 reads, from the storing unit 13, the movement information stored in the storing unit 13, and the URL of the server device 30 and the terminal ID of the wearable device 10 which are prestored in the storing unit 13. Then, the read information is sent by utilization of the wireless communicating means of the BLE (Step S3). Thereafter, the processing is returned to Step S1 and the movement information is continuously stored in the storing unit 13.

The flowchart for the portable terminal 20 shown in FIG. 4 is started when a power supply of the portable terminal 20 is turned ON, and is repetitively executed until the power supply is turned OFF.

First of all, the wireless receiving unit 21 decides whether the information sent from the wireless sending unit 12 is received (Step S11). If the wireless receiving unit 21 does not receive the sent information, the decision processing of Step S11 is repetitively executed.

On the other hand, when the portable terminal 20 approaches the wearable device 10 to enter the wireless communication range of the BLE, the wireless receiving unit 21 receives the information sent from the wireless sending unit 12. In this case, the information transmitting unit 22 activates the application of the portable terminal 20 (Step S12). Then, the information transmitting unit 22 displays a confirmation screen through the activated application (Step S13) and decides whether the user of the portable terminal 20 selects transmission of movement information or the like (Step S14).

If the user does not select the transmission of the movement information or the like, the processing of the flowchart shown in FIG. 4 is ended. On the other hand, if the user selects the transmission of the movement information or the like, the application designates URL included in the sent information received by the wireless receiving unit 21 to give access to the server device 30 and transmits, to the server device 30, the movement information and the terminal ID which are included in the sent information (Step S15).

Subsequently, the contact information acquiring unit 23 acquires, from the server device 30, a display screen including the contact information stored in the contact information storing unit 31 in relation to the terminal ID transmitted to the server device 30 by the information transmitting unit 22 and the processed movement information (for example, track information and impact information) which is processed based on the movement information transmitted to the server device 30 by the information transmitting unit 22 as a response to the access given to the server device 30 through the application (Step S16).

Then, the display control unit 24 displays the display screen acquired by the contact information acquiring unit 23, thereby displaying the contact information and the movement information (Step S17). Consequently, the processing of the flowchart shown in FIG. 4 is ended.

The flowchart for the server device 30 shown in FIG. 5 is started when a power supply of the server device 30 is turned ON, and is repetitively executed until the power supply is turned OFF.

First of all, the information receiving unit 32 decides whether access is given from the portable terminal 20 (Step S21). If the access is not given, the decision processing of Step S21 is repetitively executed.

On the other hand, when the access is given from the portable terminal 20, the information receiving unit 32 receives the movement information and the terminal ID which are sent by the access (Step S22). Then, the processing unit 33 processes the movement information received by the information receiving unit 32 so as to perform transfer (Step S23).

Next, the reporting unit 34 decides whether a larger value than a predetermined threshold is included in an output value of the acceleration sensor which is received as the movement information by the information receiving unit 32 (Step S24). If the larger output value than the predetermined threshold is not included, the processing of the flowchart shown in FIG. 5 is ended.

On the other hand, if the larger output value than the predetermined threshold is included, the reporting unit 34 reports the occurrence of the emergency to the contact details indicated by the contact information stored in the contact information storing unit 31 in relation to the terminal ID received by the information receiving unit 32 (Step S25). At this time, the reporting unit 34 transmits, to the contact details, the processed movement information which is processed by the processing unit 33 together with the report of the occurrence of the emergency.

Furthermore, the contact information offering unit 35 generates a display screen including the contact information stored in the contact information storing unit 31 in relation to the terminal ID received by the information receiving unit 32 and the processed movement information which is processed by the processing unit 33 and offers the display screen to the application of the portable terminal 20 (Step S26). Consequently, the processing of the flowchart shown in FIG. 5 is ended. By performing the processing of Step S23 after Step S24, it is also possible to process the movement information only when the larger output value than the predetermined threshold is included.

As described above in detail, according to the emergency reporting system in accordance with the present embodiment, if a person wears the wearable device 10 also in a situation in which it is hard to provide a variety of equipments, for example, various sensors, a GPS receiver and a communicating device, movement information representing movement of a body of the person and a terminal ID are transmitted to the server device 30 through the portable terminal 20 which is close thereto and transmission of processed movement information and report of occurrence of an emergency are performed for contact details related to the terminal ID. Referring to the emergency occurring in the situation in which the above equipments are provided with difficulty, consequently, the occurrence of the emergency and the movement information representing the situation can be reported to predetermined contact details.

According to the emergency reporting system in accordance with the present embodiment, moreover, the contact information related to the terminal ID and the processed movement information are transmitted to the portable terminal 20 and are thus displayed. Consequently, a third person holding the portable terminal 20 can directly make contact with a person concerned with a person having the occurrence of an emergency. Also when a third person who does not know the contact details of the person concerned with the person having the occurrence of the emergency at all finds the emergency, consequently, he (she) can inform the concerned person of the occurrence of the emergency.

Although the description has been given to the example in which the movement information and the terminal ID are transmitted from the portable terminal 20 to the server device 30 in the above embodiment, current position information may further be transmitted. In this case, as shown in FIG. 6, the portable terminal 20 further includes a current position detecting unit 25 as a functional structure thereof.

Figure 6:
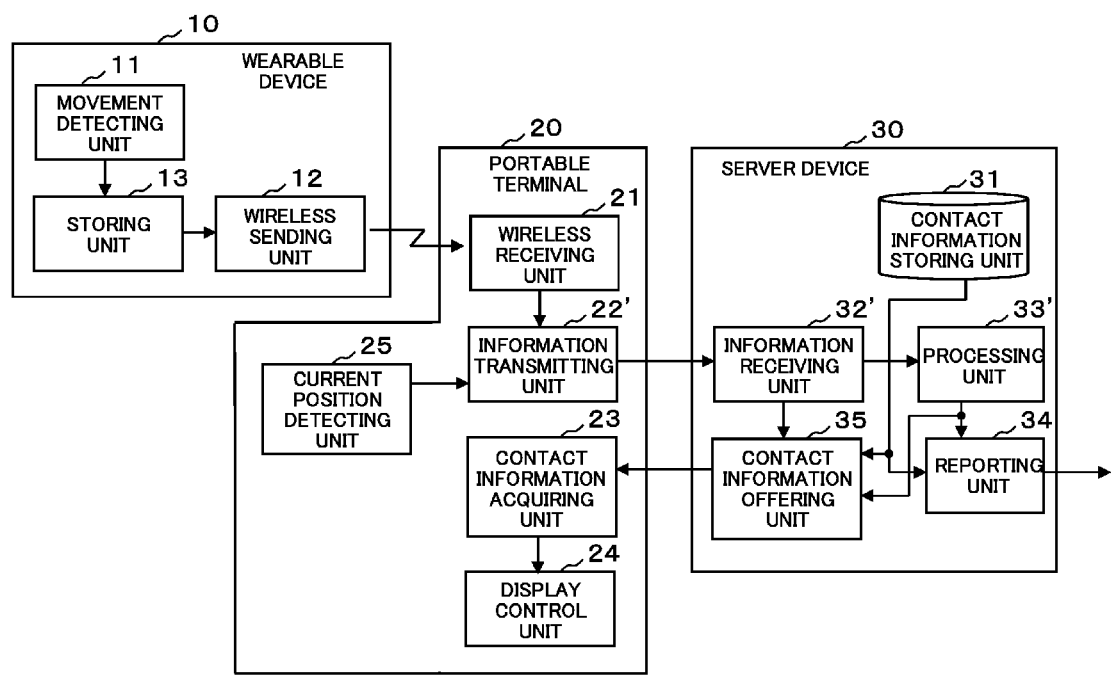
FIG. 6 is a block diagram showing an example of functional structures of a wearable device, a portable terminal and a server device which configure an emergency reporting system according to another embodiment.

With the structure shown in FIG. 6, the current position detecting unit 25 detects a current position of the portable terminal 20. For example, the current position detecting unit 25 detects the current position through a GPS receiver provided in the portable terminal 20.

When the wireless receiving unit 21 receives sent information from the wireless sending unit 12, an information transmitting unit 22' gives access to the server device 30 based on URL included in the sent information and transmits, to the server device 30, the current position information detected by the current position detecting unit 25 in addition to the movement information and the terminal ID which are included in the sent information.

An information receiving unit 32' of the server device 30 receives the movement information, the current position information and the terminal ID which are transmitted from the portable terminal 20. A reporting unit 34 transmits the movement information and the current position information which are received by the information receiving unit 32' together with the report of the occurrence of the emergency to the contact details stored in the contact information storing unit 31 in relation to the terminal ID.

Figure 7:
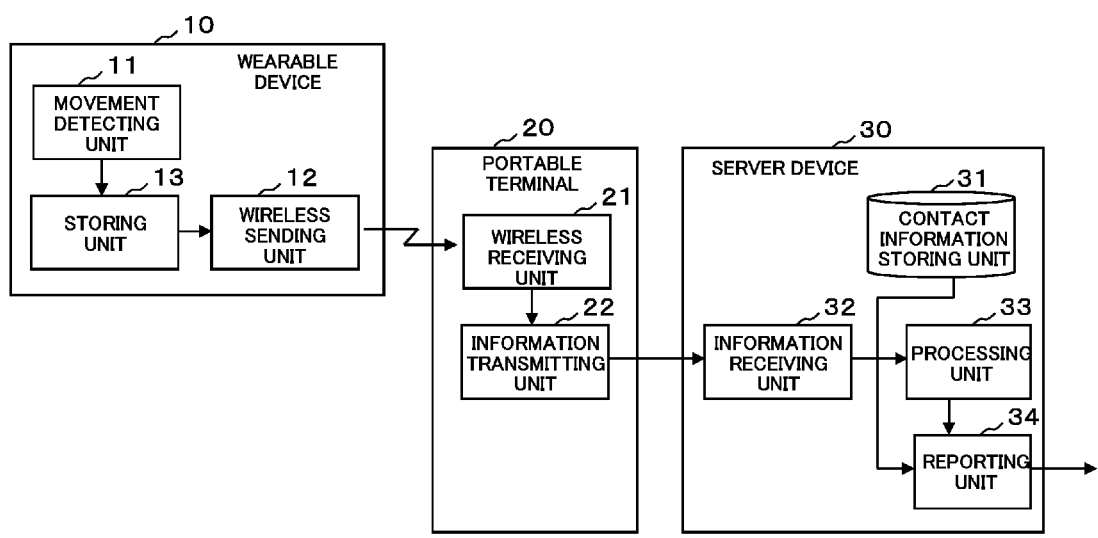
FIG. 7 is a block diagram showing an example of functional structures of a wearable device, a portable terminal and a server device which configure an emergency reporting system according to a further embodiment.
Figure 8:
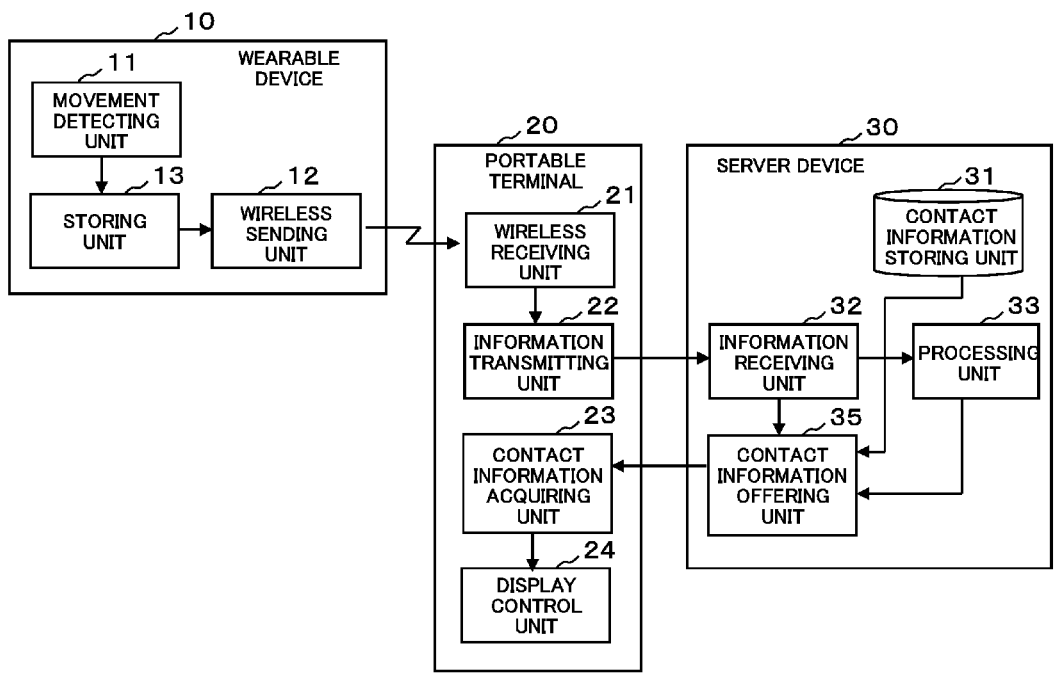
FIG. 8 is a block diagram showing an example of functional structures of a wearable device, a portable terminal and a server device which configure an emergency reporting system according to a further embodiment.

Although the description has been given to the example in which both the report to the contact details through the reporting unit 34 and the information offer to the portable terminal 20 through the contact information offering unit 35 are performed in the above embodiment, moreover, only either of them may be carried out. For example, in the case in which only the report to the contact details is performed, the portable terminal 20 includes only the wireless receiving unit 21 and the information transmitting unit 22 and the server device 30 includes only the contact information storing unit 31, the information receiving unit 32, the processing unit 33 and the reporting unit 34 as shown in FIG. 7. On the other hand, in the case in which only the information offer to the portable terminal 20 is performed, the server device 30 includes only the contact information storing unit 31, the information receiving unit 32, the processing unit 33 and the contact information offering unit 35 as shown in FIG. 8.

Figure 9:
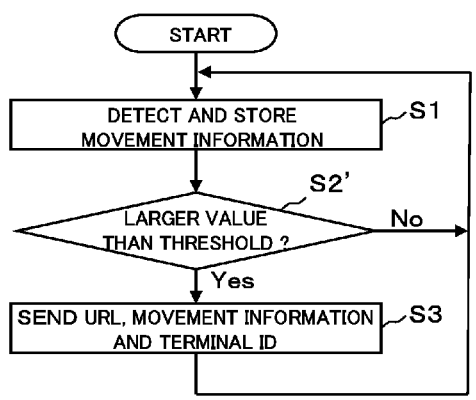
FIG. 9 is a flowchart showing an example of an operation of a wearable device according to a further embodiment.

Although the description has been given to the example in which the movement information or the like is repetitively transmitted at a certain time interval without setting conditions particularly from the wearable device 10 to the portable terminal 20 in the above embodiment, moreover, the present invention is not restricted thereto. For example, as shown in FIG. 9, the wireless sending unit 12 may push-transmit the movement information including the acceleration information, the URL and the terminal ID only when the acceleration information detected by the movement detecting unit 11 is larger than the predetermined threshold. In this case, it is not necessary to decide whether a larger value than the threshold is included in the output value of the acceleration sensor in the server device 30.

Although the description has been given to the example in which the transmission of the movement information, the terminal ID and the current position information is performed through the application installed in the portable terminal 20 in the above embodiment, furthermore, the present invention is not restricted thereto. For example, the information may be transmitted by a web browser, an electronic mail, FTP (File Transfer Protocol) or other data transmitting means.

For example, in the case in which information is to be transmitted by the web browser, the functions of the information transmitting unit 22, the contact information acquiring unit 23 and the display control unit 24 in the portable terminal 20 are implemented by utilization of the web browser.

Figure 10:
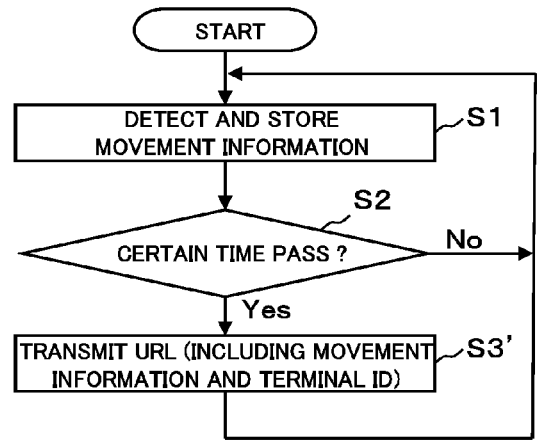
FIG. 10 is a flowchart showing an example of an operation of a wearable device according to a variant of the present embodiment.

In this case, the wireless sending unit 12 of the wearable device 10 sends information in such a configuration that the movement information and the terminal ID are added to the URL, for example (see Step S3' of FIG. 10). When the URL is "http://www.server.html", the movement information stored in the storing unit 13 (the output value of the nine-axis sensor) is "s1, s2, . . . s90" and the terminal ID is "U0001" as an example, the wireless sending unit 12 sends information in a configuration such as "http://www.server.html/?sensor=s1, s2, . . . s90/?ID=U0001". This transmitting configuration is only illustrative and the present invention is not restricted thereto.

Figure 11:
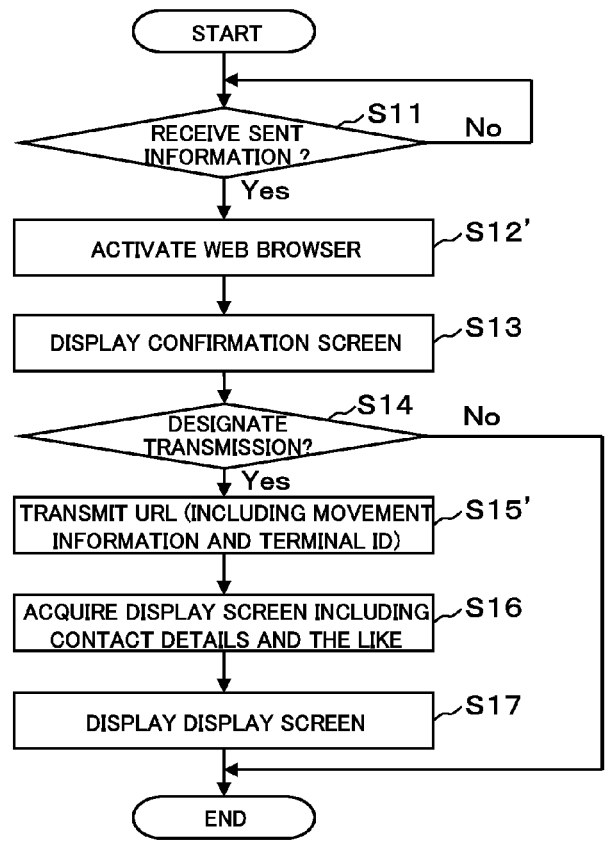
FIG. 11 is a flowchart showing an example of an operation of a portable terminal according to the variant of the present embodiment.

The information transmitting unit 22 activates the web browser of the portable terminal 20 when the wireless receiving unit 21 receives the sent information from the wireless sending unit 12 (see Step S12' in FIG. 11). Then, the URL (for example, http://www.server.html/?sensor=s1, s2, . . . s90/?ID=U0001) having the movement information and the terminal ID added thereto is transmitted from the web browser to the server device 30. Consequently, the movement information and the terminal ID are transmitted to the server device 30 (see Step S15' in FIG. 11). In other words, the information transmitting unit 22 designates the URL received by the wireless receiving unit 21 to give access to the server device 30 in the activated web browser. Thus, the movement information and the terminal ID added to the URL are transmitted to the server device 30.

The activation of the web browser and the designation of the URL can be performed by a dedicated application installed previously in the portable terminal 20, for example. In this case, the dedicated application activates the web browser to input the URL to an address input box of the web browser when the wireless receiving unit 21 receives the URL. Consequently, the web browser gives access to the server device 30 in accordance with the input URL.

Alternatively, the activation of the web browser and the designation of the URL may be performed in accordance with a program sent from the wireless sending unit 12. In this case, the wireless sending unit 12 of the wearable device 10 sends, together with the URL, a program for activating the web browser to input the URL to the address input box. Then, the information transmitting unit 22 of the portable terminal 20 activates the web browser in accordance with the program received by the wireless receiving unit 21 to designate the URL in the web browser, thereby giving access to the server device 30.

In the case in which the web browser is activated in accordance with the program transmitted from the wearable device 10 to the portable terminal 20 to designate the URL to the web browser, thereby transmitting the movement information and the terminal ID to the server device 30, thus, even if the portable terminal 20 has no dedicated application installed, the portable terminal 20 can function as a relay device for transmitting the movement information and the terminal ID sent from the wearable device 10 to the server device 30.

The contact information offering unit 35 of the server device 30 offers, to the portable terminal 20, the contact information stored in the contact information storing unit 31 in relation to the terminal ID received by the information receiving unit 32 in response to the access given from the portable terminal 20. Specifically, the contact information offering unit 35 generates a display screen to be displayed on the web browser by using the contact information related to the terminal ID and offers the display screen to the portable terminal 20.

The contact information acquiring unit 23 acquires the display screen transmitted from the contact information offering unit 35 of the server device 30 through the web browser, thereby acquiring the contact information as the information included in the display screen. The display control unit 24 causes the web browser to display the display screen acquired by the contact information acquiring unit 23, thereby displaying the contact information.

Although the description has been given on the assumption that the portable terminal 20 is held by a third person who is close to a person wearing the wearable device 10 in the above embodiment, moreover, the person wearing the wearable device 10 may hold the portable terminal 20.

For example, in the case in which the person wearing the wearable device 10 holds his (her) own portable terminal 20 when performing walking, driving a two-wheeled vehicle, or the like, the portable terminal 20 is always close to the wearable device 10 and enters the wireless communication range through the BLE. In this case, the wireless receiving unit 21 always receives the sent information push-transmitted by the wireless sending unit 12.

On the other hand, in the case in which the person wearing the wearable device 10 plays a sports game, he (or she) does not hold his (her) own portable terminal 20. In this case, when a game watcher holding the portable terminal 20 approaches the person wearing the wearable device 10 to enter the wireless communication range through the BLE, the wireless receiving unit 21 receives the sent information push-transmitted by the wireless sending unit 12.

Figure 12:
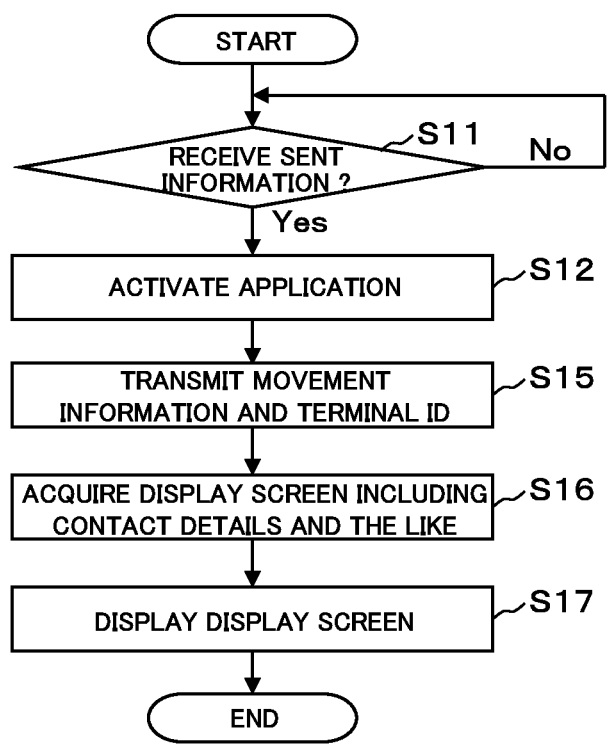
FIG. 12 is a flowchart showing an example of an operation of a portable terminal according to a further variant of the present embodiment.

In the case in which the wireless receiving unit 21 of the portable terminal 20 held by himself (herself) receives the sent information, the information transmitting unit 22 activates the application of the portable terminal 20 (which may be the web browser). Then, it is also possible to automatically transmit the movement information and the terminal ID to the server device 30 without displaying a confirmation screen for causing a user to select whether the movement information or the like is to be transmitted to the server device 30 as shown in FIG. 12.

In addition, the embodiment is only illustrative for concreteness in the execution of the present invention and the technical scope of the present invention should not be thereby construed to be restrictive. In other words, the present invention can be carried out in various configurations without departing from the gist or main features thereof.

EXPLANATION OF DESIGNATION

10 wearable device
11 movement detecting unit
12 wireless sending unit
13 storing unit
20 portable terminal
21 wireless receiving unit
22, 22' information transmitting unit
23 contact information acquiring unit
24 display control unit
25 current position detecting unit
30 server device
31 contact information storing unit
32, 32' information receiving unit
33 processing unit
34, 34' reporting unit
35 contact information offering unit

The invention claimed is:

1. An emergency reporting system including a wearable device to be worn by a person for use, a portable terminal for communicating with the wearable device and a server device for communicating with the portable terminal,
wherein the wearable device includes:
a movement detecting unit for detecting a state of movement of a body of the person; and
a wireless sending unit for sending movement information representing the state of the movement of the body which is detected by the movement detecting unit by wireless together with location information of the server device and predetermined identification information;
the portable terminal includes:
a wireless receiving unit for receiving the information sent by the wireless sending unit; and
an information transmitting unit for giving access to the server device based on the location information and transmitting, to the server device, the movement information and the identification information which are received by the wireless receiving unit when the wireless receiving unit receives the information transmitted by the wireless transmitting unit,
the server device includes:
a contact information storing unit for storing the identification information and contact information in relation to each other;
a processing unit for processing the movement information transmitted by the information transmitting unit so as to perform transfer ; and
a reporting unit for reporting occurrence of an emergency to contact details indicated by the contact information stored in the contact information storing unit in relation to the identification information transmitted by the information transmitting unit in response to access given from the portable terminal, and
the reporting unit transmits, to the contact details, processed movement information which is processed by the processing unit together with the report of the occurrence of the emergency.

2. The emergency reporting system according to claim 1, wherein the server device further includes:
a contact information offering unit for offering, to the portable terminal, the contact information stored in the contact information storing unit in relation to the identification information in response to the access given from the portable terminal, and
the portable terminal further includes:
a contact information acquiring unit for acquiring the contact information offered by the contact information offering unit; and
a display control unit for displaying the contact information acquired by the contact information acquiring unit.

3. The emergency reporting system according to claim 2, wherein the contact information offering unit offers, to the portable terminal, the processed movement information which is processed by the processing unit in addition to the contact information,
the contact information acquiring unit acquires the contact information and the processed movement information which are offered by the contact information offering unit, and
the display control unit displays the contact information and the processed movement information which are acquired by the contact information acquiring unit.

4. The emergency reporting system according to claim 1, wherein the wireless sending unit sends information in such a configuration that the movement information and the identification information are added to the location information, and
the information transmitting unit designates the location information having the movement information and the identification information added thereto in a web browser of the portable terminal to give access to the server device, thereby transmitting the movement information and the identification information to the server device.

5. The emergency reporting system according to claim 4, wherein the wireless sending unit sends a program for activating the web browser of the portable terminal to designate the location information together with the location information, and
the information transmitting unit activates the web browser in accordance with the program received by the wireless receiving unit to designate the location information in the web browser, thereby giving access to the server device.

6. The emergency reporting system according to claim 4, wherein the server device further includes:
- a contact information offering unit for generating a display screen by using the contact information stored in the contact information storing unit in relation to the identification information in response to the access given from the portable terminal and offering the display screen to the portable terminal, and the portable terminal further includes:
- a contact information acquiring unit for acquiring the display screen offered by the contact information offering unit, thereby acquiring the contact information as information to be included in the display screen; and
- a display control unit for displaying, on the web browser, the display screen acquired by the contact information acquiring unit, thereby displaying the contact information.

7. The emergency reporting system according to claim 6, wherein the contact information offering unit generates a display screen by using the processed movement information which is processed by the processing unit in addition to the contact information and offers the display screen to the portable terminal,
- the contact information acquiring unit acquires the display screen offered by the contact information offering unit, thereby acquiring the contact information and the processed movement information as information to be included in the display screen, and
- the display control unit causes the web browser to display the display screen acquired by the contact information acquiring unit, thereby displaying the contact information and the processed movement information.

8. The emergency reporting system according to claim 1, wherein the portable terminal further includes a current position detecting unit for detecting a current position,
- the information transmitting unit transmits current position information detected by the current position detecting unit to the server device in addition to the movement information and the identification information, and
- the reporting unit transmits, to the contact details, the processed movement information processed by the processing unit and the current position information transmitted by the information transmitting unit together with the report of the occurrence of the emergency.

9. The emergency reporting system according to claim 1, wherein the reporting unit reports the occurrence of the emergency when a larger value than a predetermined threshold is included in values representing the state of the movement of the body indicated by the movement information transmitted by the information transmitting unit.

10. The emergency reporting system according to claim 2, wherein the contact information offering unit offers the contact information to the portable terminal when a larger value than a predetermined threshold is included in values representing the state of the movement of the body indicated by the movement information transmitted by the information transmitting unit.

11. The emergency reporting system according to claim 1, wherein the wireless sending unit sends the movement information by wireless together with the location information and the predetermined identification information when a value representing the state of the movement of the body detected by the movement detecting unit is larger than a predetermined threshold.

12. An emergency reporting system including a wearable device to be worn by a person for use, a portable terminal for communicating with the wearable device and a server device for communicating with the portable terminal, wherein the wearable device includes:
- a movement detecting unit for detecting a state of movement of a body of the person; and
- a wireless sending unit for sending movement information representing the state of the movement of the body which is detected by the movement detecting unit by wireless together with location information of the server device and predetermined identification information;

the portable terminal includes:
- a wireless receiving unit for receiving the information sent by the wireless sending unit;
- an information transmitting unit for giving access to the server device based on the location information and transmitting, to the server device, the movement information and the identification information which are received by the wireless receiving unit when the wireless receiving unit receives the information sent by the wireless sending unit;
- a contact information acquiring unit for acquiring, from the server device, contact information related to the identification information and processed movement information which is processed based on the movement information as a response to the access given to the server device; and
- a display control unit for displaying the contact information and the processed movement information which are acquired by the contact information acquiring unit, and the server device includes:
- a contact information storing unit for storing the identification information and the contact information in relation to each other;
- a processing unit for processing the movement information transmitted by the information transmitting unit so as to perform transfer; and
- a contact information offering unit for offering, to the portable terminal, the contact information stored in the contact information storing unit in relation to the identification information and the processed movement information which is processed by the processing unit in response to access given from the portable terminal.

* * * * *